(12) United States Patent
Burrough

(10) Patent No.: US 10,540,809 B2
(45) Date of Patent: Jan. 21, 2020

(54) METHODS AND APPARATUS FOR TRACKING A LIGHT SOURCE IN AN ENVIRONMENT SURROUNDING A DEVICE

(71) Applicant: Bobby Gene Burrough, San Jose, CA (US)

(72) Inventor: Bobby Gene Burrough, San Jose, CA (US)

( * ) Notice: Subject to any disclaimer, the term of this patent is extended or adjusted under 35 U.S.C. 154(b) by 68 days.

(21) Appl. No.: 15/801,095

(22) Filed: Nov. 1, 2017

(65) Prior Publication Data

US 2019/0005675 A1   Jan. 3, 2019

Related U.S. Application Data

(60) Provisional application No. 62/527,778, filed on Jun. 30, 2017.

(51) Int. Cl.
| | |
|---|---|
| *G06T 15/50* | (2011.01) |
| *G06T 7/20* | (2017.01) |
| *G06T 7/73* | (2017.01) |
| *H04N 13/388* | (2018.01) |
| *H04N 9/31* | (2006.01) |
| *G06F 3/048* | (2013.01) |
| *G06T 13/20* | (2011.01) |

(52) U.S. Cl.
CPC .............. *G06T 15/50* (2013.01); *G06F 3/048* (2013.01); *G06T 7/20* (2013.01); *G06T 7/73* (2017.01); *G06T 13/20* (2013.01); *H04N 9/3179* (2013.01); *H04N 13/388* (2018.05)

(58) Field of Classification Search
CPC ... G06K 9/00624; G06T 19/006; G06T 15/50; G06T 7/20; G06T 7/73; G06T 13/20; H04M 1/0202; H04N 13/388; H04N 9/3179; G06F 3/048
See application file for complete search history.

(56) References Cited

U.S. PATENT DOCUMENTS

| | | | |
|---|---|---|---|
| 5,040,005 | A | 8/1991 | Davidson et al. |
| 6,285,393 | B1 | 9/2001 | Shimoura et al. |
| 6,369,830 | B1 | 4/2002 | Brunner et al. |

(Continued)

FOREIGN PATENT DOCUMENTS

| | | |
|---|---|---|
| CN | 1578414 A | 2/2005 |
| WO | 2002037179 A2 | 5/2002 |

*Primary Examiner* — Brenda C Bernardi
(74) *Attorney, Agent, or Firm* — JW Law Group; James M. Wu

(57) ABSTRACT

Methods and apparatus for tracking a light source in an environment surrounding a device. In an exemplary embodiment, a method includes analyzing an image of an environment surrounding a device to detect a light source and calculating a location of the light source relative to the device. The method also includes receiving motion data corresponding to movement of the device, and adjusting the location of the light source based on the motion data. In an exemplary embodiment, an apparatus includes an image sensor that acquires an image of an environment surrounding a device, and a motion tracking element that outputs motion data that corresponds to motion of the device. The apparatus also includes a tracker that analyzes the image to detect a light source, calculates a location of the light source relative to the device, and adjusts the location of the light source based on the motion data.

20 Claims, 7 Drawing Sheets

(56) References Cited

U.S. PATENT DOCUMENTS

| | | |
|---|---|---|
| 6,559,853 B1 | 5/2003 | Hashimoto et al. |
| 7,479,949 B2 | 1/2009 | Jobs et al. |
| 7,657,849 B2 | 2/2010 | Chaudhri et al. |
| 7,694,233 B1 | 4/2010 | Ording |
| 7,742,073 B1 | 6/2010 | Cohen-Solal et al. |
| 8,180,112 B2 | 5/2012 | Kurtz et al. |
| 8,581,905 B2 | 11/2013 | Mitchell |
| 8,788,977 B2 | 7/2014 | Bezos |
| 8,913,004 B1 | 12/2014 | Bozarth et al. |
| 9,142,062 B2 * | 9/2015 | Maciocci ................ G06F 3/011 |
| 9,324,183 B2 | 4/2016 | King et al. |
| 9,405,918 B2 | 8/2016 | Freed et al. |
| 9,733,339 B2 | 8/2017 | Kotake et al. |
| 2005/0008256 A1 * | 1/2005 | Uchiyama ................ G06T 7/80 382/291 |
| 2005/0059488 A1 | 3/2005 | Larsen et al. |
| 2006/0227103 A1 | 10/2006 | Koo et al. |
| 2009/0325607 A1 | 12/2009 | Conway et al. |
| 2010/0013796 A1 | 1/2010 | Abileah et al. |
| 2010/0045667 A1 | 2/2010 | Kornmann et al. |
| 2010/0079371 A1 | 4/2010 | Kawakami et al. |
| 2010/0275122 A1 | 10/2010 | Buxton et al. |
| 2011/0115883 A1 | 5/2011 | Kellerman et al. |
| 2012/0020522 A1 | 1/2012 | Soderstrom |
| 2012/0314899 A1 | 12/2012 | Cohen et al. |
| 2013/0091462 A1 | 4/2013 | Gray et al. |
| 2016/0292924 A1 * | 10/2016 | Balachandreswaran ..................... G06T 19/006 |
| 2017/0169617 A1 * | 6/2017 | Rodriguez, II ....... G06T 19/006 |
| 2017/0177939 A1 * | 6/2017 | Beall ................ G06K 9/00671 |
| 2017/0209716 A1 * | 7/2017 | Lugosi ................ A61N 5/1049 |

\* cited by examiner

METHODS AND APPARATUS FOR TRACKING A LIGHT SOURCE IN AN ENVIRONMENT SURROUNDING A DEVICE

CLAIM TO PRIORITY

This application claims the benefit of priority based upon U.S. Provisional Patent Application having Application No. 62/527,778, filed on Jun. 30, 2017, and entitled "GENERATION AND USE OF DYNAMIC REAL-TIME ENVIRONMENT MAPS," which is hereby incorporated herein by reference in its entirety.

FIELD

The present invention relates to the operation of image processing systems. More specifically, the present invention relates to the processing of images derived from a surrounding environment.

BACKGROUND

Over the last twenty-five years, mobile computers have grown smaller and more sophisticated. Billions of handheld devices have been sold and now pervade many aspects of daily life. As such, devices have found use in widely varying circumstances. The differing conditions of these circumstances present designers of hardware and software with unique challenges to providing experiences that are functional, let alone rich and compelling.

With the advent of mixed reality, developers have been searching for new ways to better integrate a device with its surroundings. As the variety of experiences with mobile devices increases, the need for more capable and higher fidelity control mechanisms grows. For example, augmented and virtual reality have dramatically increased the degree of immersion for the end user. However, while such increases meet the prima facie goals of these technologies, their adoption is constrained to the degree that they cannot cope with diverse and wide-ranging situations. Technologies which cease to function in categorical conditions are hindered from further use and adoption.

Therefore, it would be desirable to provide effective, immersive control mechanisms capable of coping with a variety of situations based on the relationship between the user, their device, and their surroundings.

SUMMARY

In various exemplary embodiments, methods and apparatus are provided for tracking light sources and/or other features in an environment surrounding a device. In an exemplary embodiment, an image of an environment surrounding a device is captured, analyzed according to a heuristic to detect a light source and the angular coordinates of the light source relative to the device are calculated. The coordinates are updated over time according to information from a motion tracking element to update the light source's location relationship with the device. By accurately detecting and tracking light sources and/or other features in the environment surrounding a device, the methods and apparatus described herein can be used to improve the performance, efficiency, and robustness of systems based on computer vision.

In an exemplary embodiment, a method is provided that includes analyzing an image of an environment surrounding a device to detect a light source and calculating a location of the light source relative to the device. The method also includes receiving motion data corresponding to movement of the device, and adjusting the location of the light source based on the motion data.

In an exemplary embodiment, an apparatus is provided that includes an image sensor that acquires an image of an environment surrounding a device, and a motion tracking element that outputs motion data that corresponds to motion of the device. The apparatus also includes a tracker that analyzes the image to detect a light source, calculates a location of the light source relative to the device, and adjusts the location of the light source based on the motion data.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which should not be taken to limit the invention to the specific embodiments, but are for explanation and understanding only.

DETAILED DESCRIPTION

Figure 1:
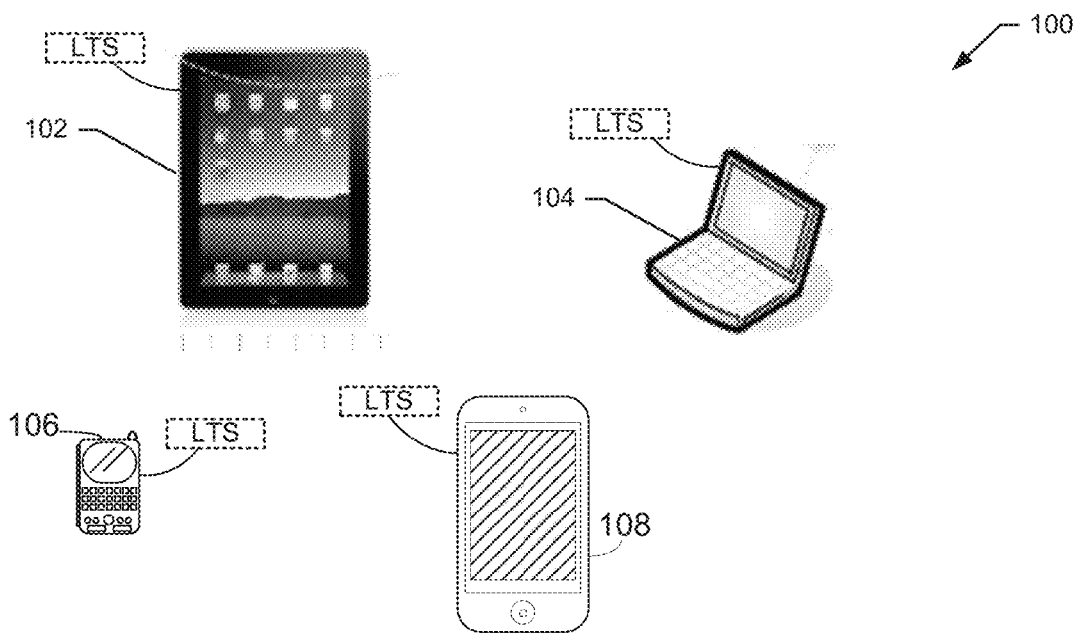
FIG. 1 shows devices comprising exemplary embodiments of a light tracking system.

The purpose of the following detailed description is to provide an understanding of one or more embodiments of the present invention. Those of ordinary skill in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business-related constraints, and that these specific goals will vary from one implementation to another and from one developer to another. Moreover, it will be understood that such a development effort might be complex and time-consuming, but would nevertheless be a routine undertaking of engineering for those of ordinary skill in the art having the benefit of the embodiments of this disclosure.

Various exemplary embodiments illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

FIG. 1 shows devices 100 comprising exemplary embodiments of a light tracking system (LTS). For example, the LTS operates to detect and track light sources in images of the surrounding environment. In an exemplary embodiment, virtually any type of light source can be detected and tracked. The devices shown include tablet computer 102, notebook computer 104, cell phone 106, and smart phone 108. It should be noted that embodiments of the LTS are suitable for use with virtually any type of device to detect and track light sources in the surrounding environment. For example, the LTS also is suitable for use with automobile dashboard systems, billboards, stadium big screens, and virtually all types of devices that perform image processing.

In one exemplary embodiment, the light tracking system is entirely integrated into a handheld device that has one or more cameras. The processing of the LTS is performed internal to the device without having to communicate with an external processing system. Thus, the light tracking system operates in a portable device to provide light source detection and tracking to enhance display renderings and user interface applications.

Figure 2:
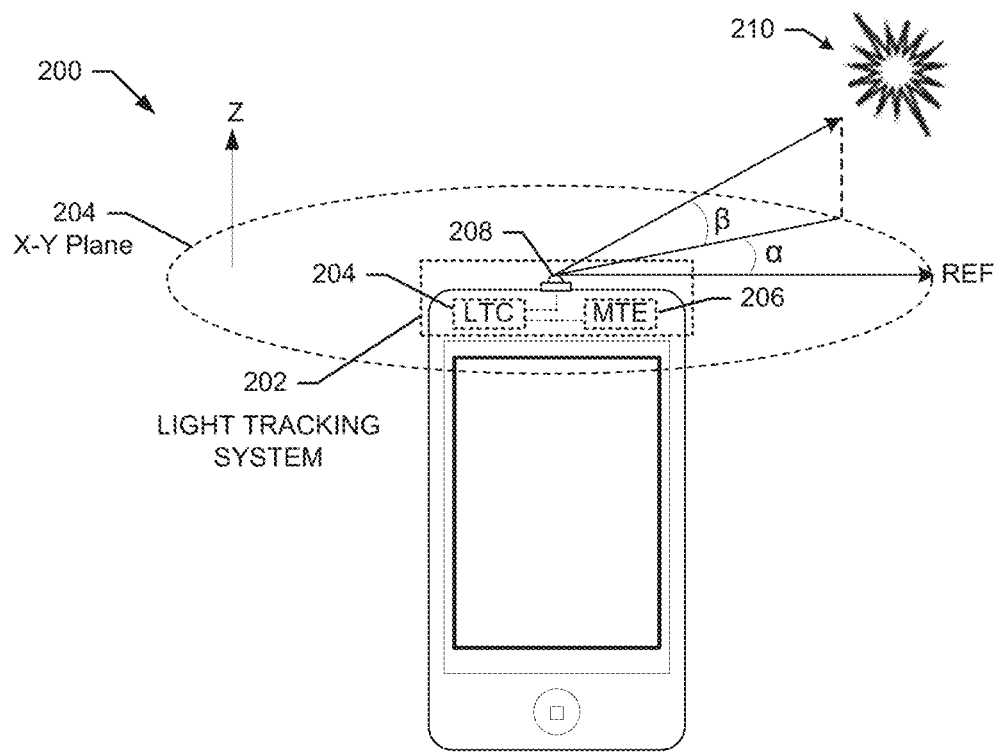
FIG. 2 shows a device that includes an exemplary embodiment of a light tracking system.

FIG. 2 shows a device 200 that includes an exemplary embodiment of a light tracking system 202. The LTS 202 includes light tracking circuit (LTC) 204, motion tracking element (MTE) 206, and image sensor 208. The image sensor 208 operates to acquire real-time images of the environment surrounding the device 200. The LTC 204 receives the captured images and detects and tracks the location of light sources in the images using motion data received from the MTE 206.

In at least one embodiment, the location of a light source means its direction relative to a reference direction associated with the device. For example, the reference direction can be determined from the device itself (e.g., orientation of the display screen), from the orientation of the image sensor that captured the image, or by any other definition. The direction to the light source is expressed in terms of azimuthal angles (e.g., latitude and longitude) relative to the reference direction. For example, the LTS may easily detect the Sun as a light source in an image, and then compute the azimuthal angles to the detected light source relative to the reference direction (REF).

In at least one embodiment, the location of a light source means its three-dimensional (3D) position relative to the device. As such, the distance and direction between the device and the light source are represented. In an exemplary embodiment, a structured light sensor is used to detect both the relative direction of a light source in the image and the distance between the device and the light source. For example, the structured light sensor may measure the relative direction and distance from a smartphone device to a ceiling light in an office setting. The position (e.g., relative direction and distance) of the real, physical light source as measured by the structured light sensor is used to compute a 3D position of the light source relative to the device and this 3D position is then used to render the light source or its effects on a display device.

In an exemplary embodiment, the LTS 202 detects and locates light sources in the environment surrounding the device 200 from images acquired by the sensor 208. For example, the LTS 202 detects the light source 210 and determines its position relative to the device 200, relative to the orientation of a device display screen, relative to a reference (REF) direction associated with the device, or relative to any other direction. For example, the LTC 204 analyzes the captured images using one or more heuristics to identify one or more light sources in the image. Once a light source is identified, its location is calculated relative to the device, such as by calculating the direction of the light source relative to the REF direction or by calculating the 3D position of the light source relative to the device. Since the orientation of the image sensor 208 to the device 200 is known, the orientation of the captured image to the REF direction is also known. Thus, the LTC 204 is able to translate the location of the light source in the image to a direction of the light source relative to the REF direction.

In an exemplary embodiment, the LTC 204 calculates azimuthal angles ($\alpha$) and ($\beta$) that determine the direction of the light source relative to the REF direction in the X-Y plane. It should be noted that the LTS 202 is not limited to detecting only one light source; thus, multiple light sources can be detected and their associated relative directions determined by the LTS 202.

Once the relative direction of the detected light source is determined, motion data from the MTE 206 is used to update that relative direction as the device and/or image sensor are moved. For example, in an exemplary embodiment, the MTE 206 comprises a three-axis gyroscope that outputs motion data corresponding to the movement of the device 200. This motion data represents changes to the orientation of the device. The LTC 204 uses this motion data to adjust the relative directions of the detected light sources (e.g., light source 210) as the device 200 moves.

Conventional systems may utilize an optical tracking mechanism that captures a series of frames and optically analyzes each frame in a resource intensive manner. Instead of optically analyzing every single frame of video, the exemplary embodiments of the LTS described herein operate to capture an image via the image sensor, analyze the image to detect light sources and their relative locations, and then update the relative locations over time based on a motion data from a motion tracking element. In this way, the optical recognition requirements may either be "clocked down" by reducing the number of frames that are optically analyzed per unit time, or the relative position of the detected light sources may be updated at rates far beyond those which are typical in video acquisition (even beyond 240 frames per second). This can be accomplished by utilizing, for example, a three-axis gyroscope as a motion tracking element that can output hundreds of measurements per second and therefore allow the relative directions of the light sources to be updated at rates substantially faster than the video frame rates used for optical analysis.

In various exemplary embodiments, the LTS provides increased robustness over conventional systems since tracking is largely based on motion data from the MTE 206. In conventional systems, tracking is performed using optical image analysis that is dependent upon the visibility of the tracked light source. However, the LTS can operate in situations where conventional systems would fail, such as in darkness, when a light source is occluded or obstructed, when a light source is out of focus or outside the depth of field, or in changing brightness conditions that might result in auto-exposure delay. Thus, by augmenting image analysis with supplemental motion data, the location of a light source may be tracked in the above cited conditions until image analysis is able to reacquire the light source.

Figure 3:
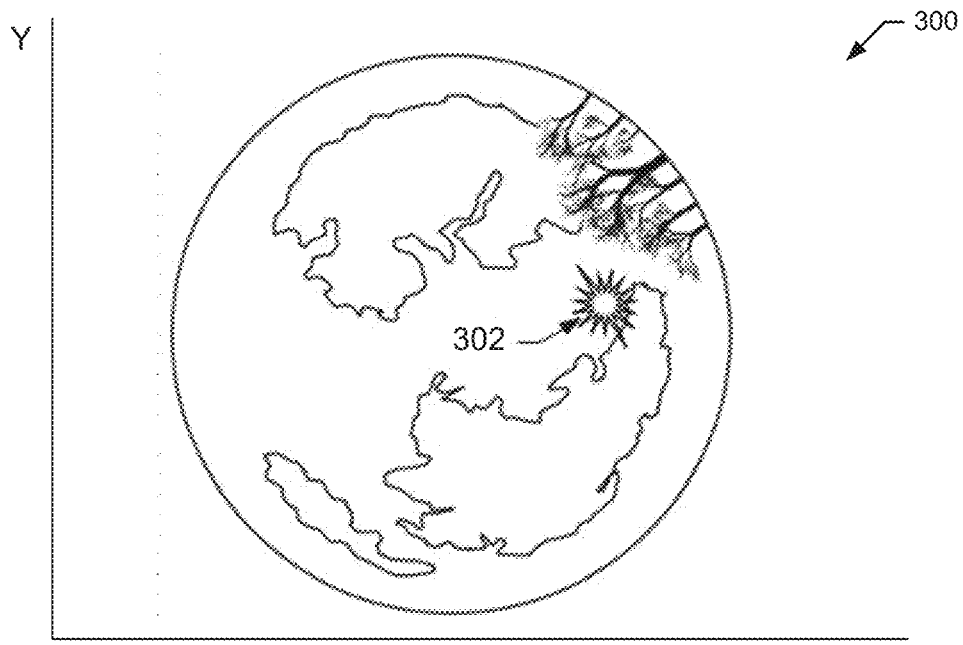
FIG. 3 shows an exemplary embodiment of a captured image of an environment surrounding a device.

FIG. 3 shows an exemplary embodiment of an image 300 of an environment surrounding a device. For example, the image 300 may be an image captured by the image sensor 206 shown in FIG. 2. The captured image 300 includes the light source 302 represented by the Sun and is shown in the X-Y plane illustrated at 204 in FIG. 2. In one exemplary embodiment, the image sensor is arranged such that its focal axis is aligned (or can be translated) to the REF direction. In an exemplary embodiment, the reference direction is along the X-axis. Given this alignment and a particular field of view of the image sensor, each two-dimensional (2D) coordinate in the captured image can be converted to corresponding azimuthal angles that can be used to locate features, objects, or characteristics in the image. This information is the basis for detecting and tracking light sources in the captured images.

Figure 4:
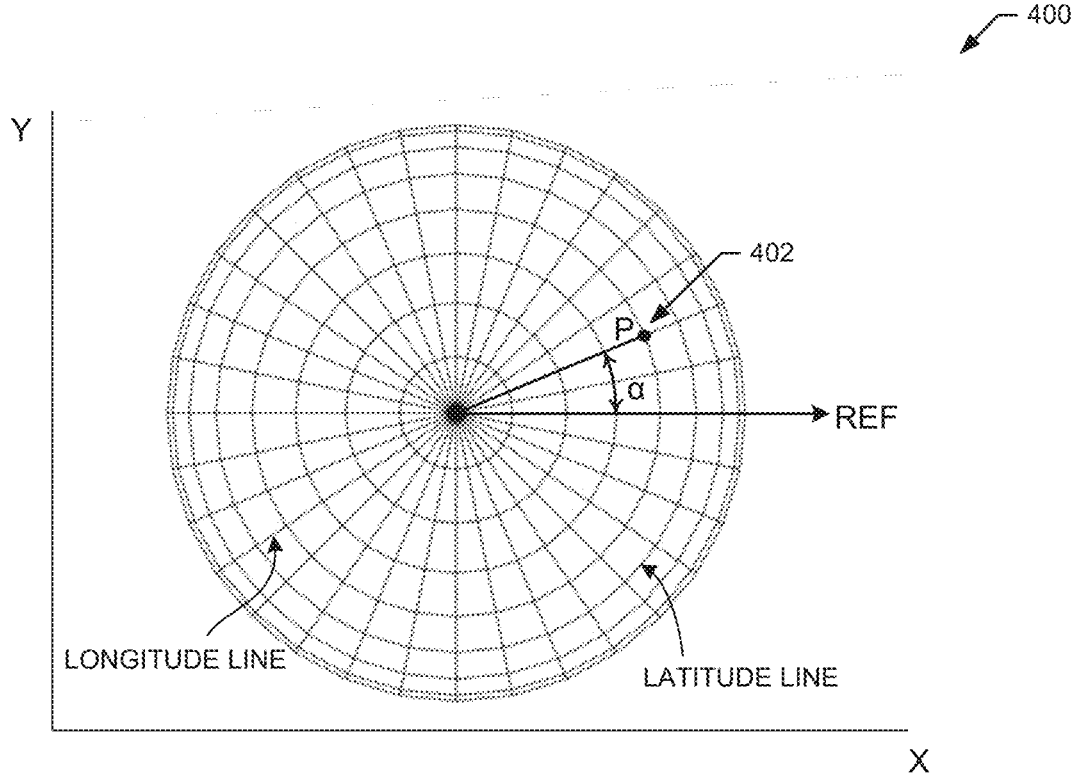
FIG. 4 shows an exemplary embodiment of a graph that illustrates latitudinal and longitudinal relationships of the field of view of the image sensor that captured the image shown in FIG. 3.

FIG. 4 shows an exemplary embodiment of a graph 400 that illustrates the latitudinal and longitudinal relationship of the field of view of the image sensor that captured the image 300 shown in FIG. 3. The point P 402 corresponds to a particular latitude and longitude (e.g., azimuthal angles) of the detected light source 302 shown in FIG. 3.

In an exemplary embodiment of a light detection heuristic, the light source 302 is detected by converting each pixel in the image 300 from its initial red-green-blue (RGB) value to a luminosity value L. The values of R, G, and B are constrained to the range [0, 1]. The luminosity value can be computed from the following expression.

$$L = \text{sqrt}\,(0.299*R^2 + 0.587*G^2 + 0.114*B^2)$$

Once each pixel has been converted to luminosity, the pixel(s) with the greatest luminosity are selected to represent one or more light sources. It should be noted that the above implementation is exemplary and that any suitable heuristic can be used to detect light sources in the image 300.

Once the light sources are detected, the azimuth angle (α) between the REF direction and the detected light source in the image 300 can be calculated since the X-Y location of the light source is known. The longitudinal angle (β) for the detected light source also can be determined from the X-Y location of the light source in the image. For example, each pixel location of the detected light source in the image corresponds to particular latitudinal and longitude angles as illustrated in FIG. 4.

Figure 5:
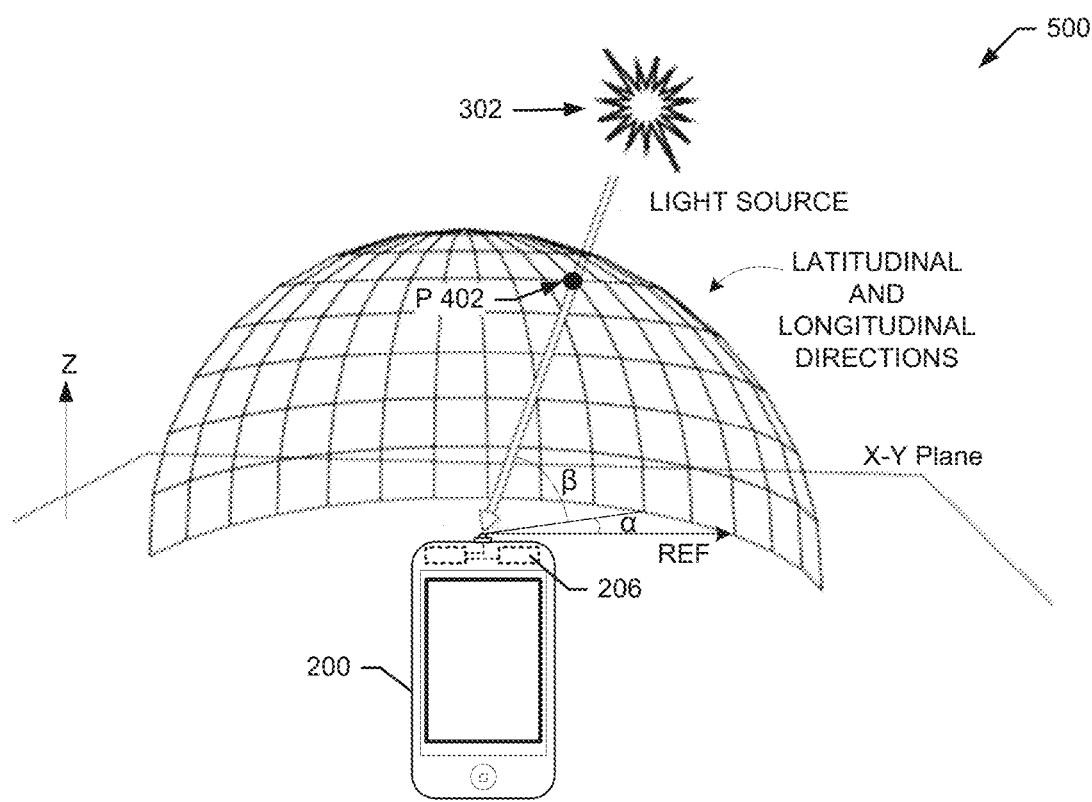
FIG. 5 shows an exemplary embodiment of a three-dimensional view that illustrates relationships between a device and a detected light source in the environment surrounding the device.

FIG. 5 shows an exemplary embodiment of a three-dimensional (3D) view 500 that illustrates the relationship between a device and a detected light source in the environment surrounding the device. In an exemplary embodiment, a light source 302 has a location to the device 200 based on its direction relative to the REF direction associated with the device 200. For example, the angles α and β represent the longitudinal and latitudinal angles of the light source 302 relative to the reference direction REF. Once the location of the light source 302 is determined, this location is updated based on motion data received from the motion tracking element 206. In an exemplary embodiment, the locations of the light sources are tracked using the motion data until another image detection is performed to detect the relative locations of the light sources from newly acquired images.

Figure 6:
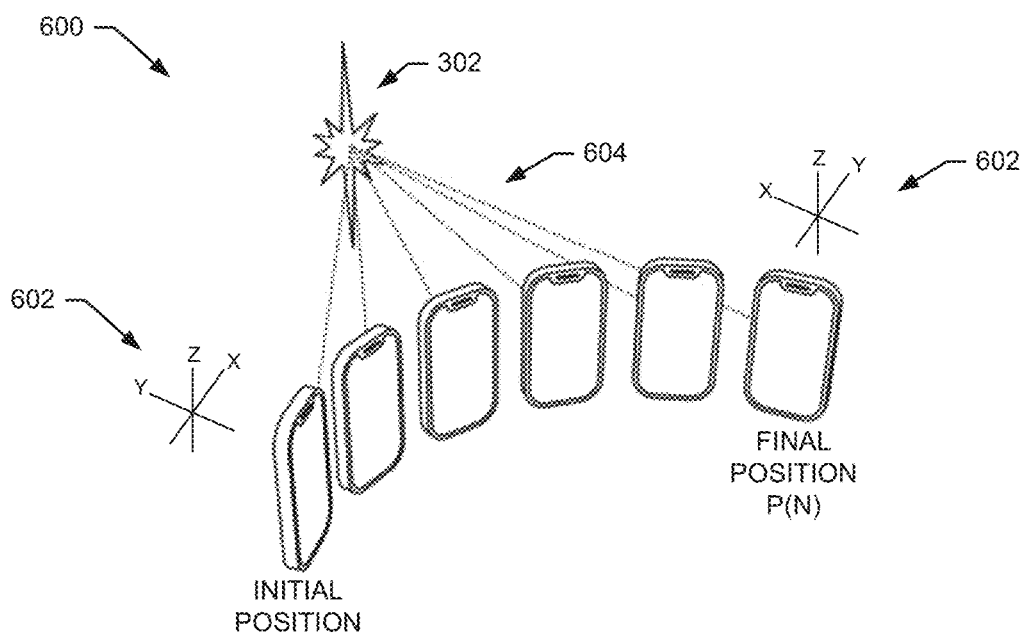
FIG. 6 shows a diagram that illustrates the operation of an exemplary embodiment of a light tracking system to track a relative position of a light source in a surrounding environment as a device is moved.

FIG. 6 shows an exemplary diagram 600 that illustrates the operation of the LTS to track a position of a light source in a captured image as a device is moved. For example, in an exemplary embodiment, the light source to be tracked is the light source 302 that appears in an image captured by an image sensor 208 located on the device 200. The position (P0) is the initial position of the device 200 when the image is captured. A local 3D coordinate system 602 relative to the device is shown at the device's initial position. From this initial position, the location of the light source is detected from the capture images as described above. As the device 200 is moved over time to the final position (PN), the LTS operates to track the location of the light source 302 using motion data from a MTE 206 at the device 200. The local 3D coordinate system 602 relative to the device is shown at the device's final position PN. The angles that the lines 604 make with the local coordinate system 602 illustrates how the location of the light source 302 changes with the movement of the device 200. In various exemplary embodiments, the changing location of the light source 302 is tracked using motion data output from the MTE 206.

Figure 7:
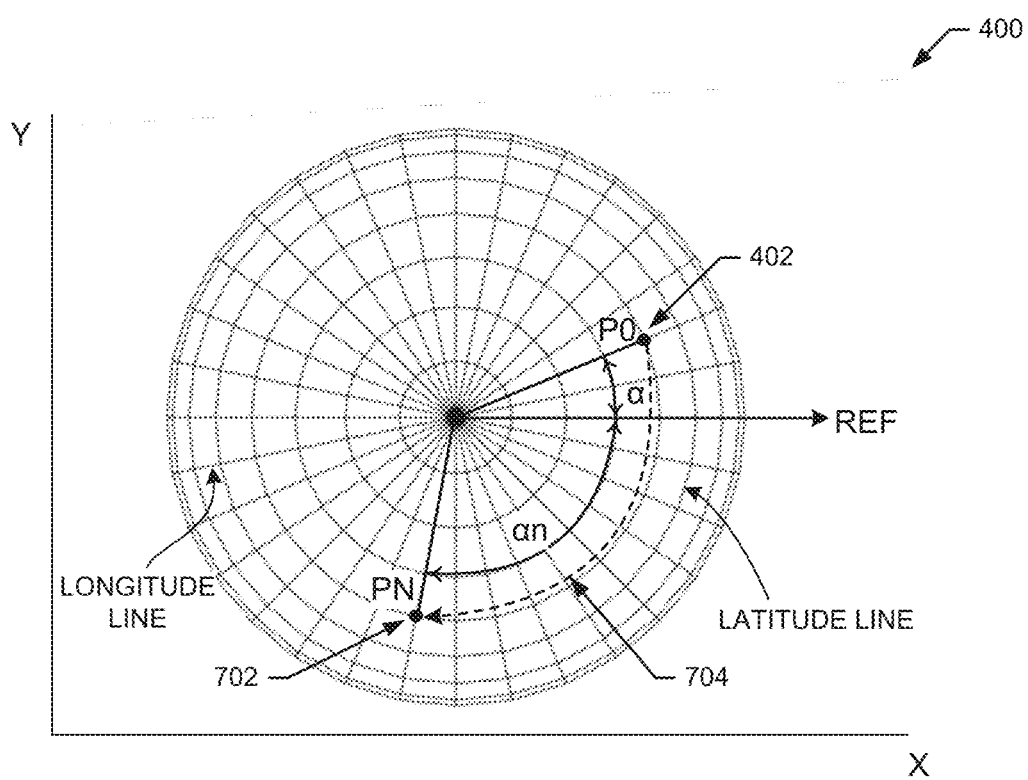
FIG. 7 shows an exemplary embodiment of the graph shown in FIG. 4 that has been updated with the movement of the device as illustrated in FIG. 6.

FIG. 7 shows an exemplary embodiment of the graph 400 that is updated with the movement of the device 200 as illustrated in FIG. 6. For example, the device 200 is initially located at position P0 when it first acquires an image. The detected light source 302 has a relative location shown by point 402 at position P0. After the device 200 is moved to the position PN, the updated location of the detected light source is shown by point 702 at position PN. The tracking line 704 illustrates the relative location of the detected light source as it is tracked from position P0 to position PN using motion data from the MTE 206. For example, the longitudinal (azimuth) angle changes from α to αn. In an exemplary embodiment, the LTS utilizes motion data from the MTE 206 to track the location of the detected light source as the device 200 moves from position P0 to PN.

Figure 8:
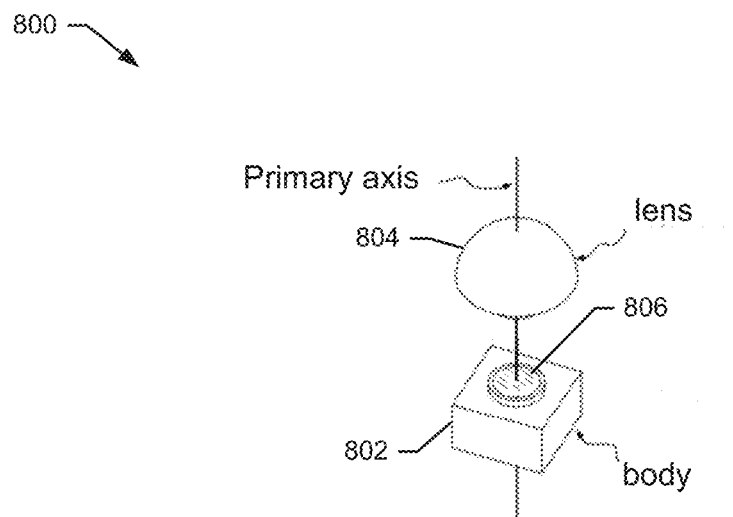
FIG. 8 shows a detailed exemplary embodiment of an image sensor for use with exemplary embodiments of a light tracking system.

FIG. 8 shows a detailed exemplary embodiment of an image sensor 800 for use with the LTS 202. For example, the image sensor 800 is suitable for use as part of the image sensors 206 shown in FIG. 2. The image sensor 800 comprises a sensor body 802 that houses an image sensor 806 that is covered by a lens 804. For example, the lens 804 may be a wide-angle, fisheye lens. However, other factors such as cost and form factor may affect the choice of lens design for a given implementation.

In this particular embodiment, the lens 804 operates to provide a wide field of view of the surrounding environment that is captured by the image sensor 806. In other embodiments, different sensor/lens combinations are used to acquire a desired field of view of the surrounding environment. Evaluation of a particular sensor/lens configuration should consider the accuracy of the system's ability to project the image onto the surface of the image sensor 806.

Figure 9:
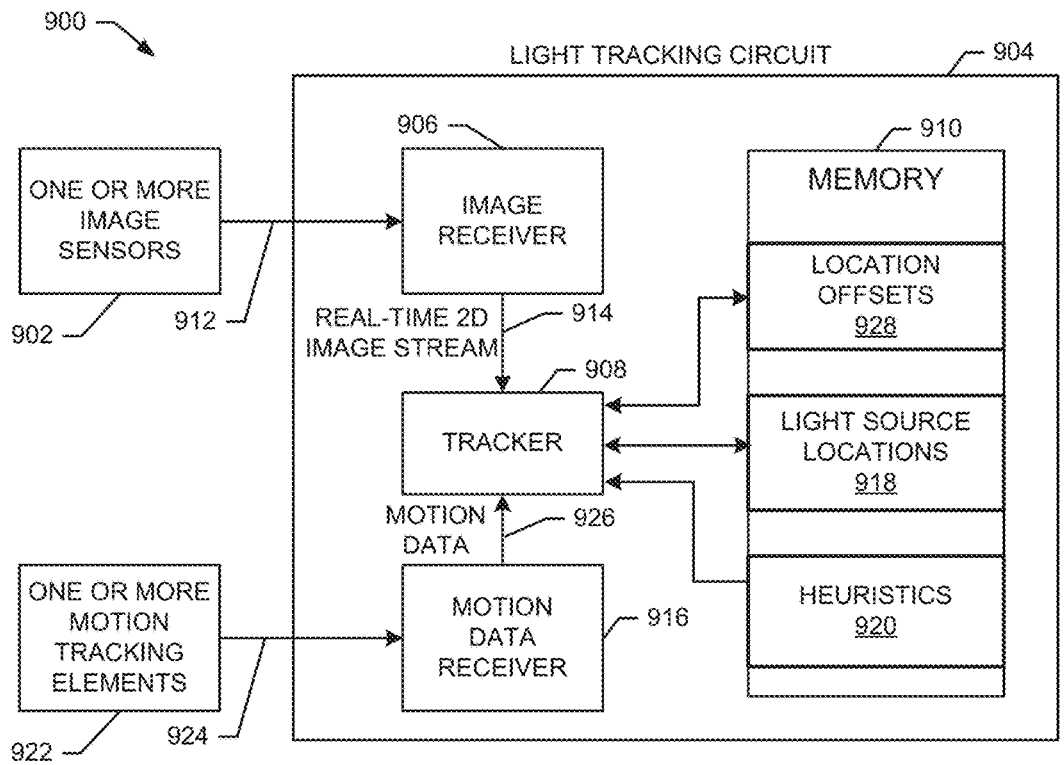
FIG. 9 shows a detailed exemplary embodiment of a light tracking system.

FIG. 9 shows a detailed exemplary embodiment of a light tracking system 900. For example, the LTS 900 is suitable for use as the LTS 202 shown in FIG. 2. The LTS 900 comprises one or more image sensors 902, one or more motion tracking elements 922, and a light tracking circuit (LTC) 904. The image sensors 902 comprise one or more high-resolution image sensors that output real-time 2D images. For example, each image sensor can output a stream of real-time 2D image frames at 30 frames per second (fps) (or other suitable frame rate). The stream of 2D images output from the images sensors 902 is shown at 912.

In an exemplary embodiment, the motion tracking elements 922 comprise at least one motion tracking element selected from a set comprising a 3-axis gyroscope, compass, accelerometer, global positioning system (GPS) unit, laser interferometer, and ultrasonic sensor. It should be noted that the motion tracking elements 922 are not limited to these embodiments and that any virtually any type of motion tracking element can be utilized. The motion tracking elements can be initialized or reset and then output raw motion data 924 that represents the changing orientation of the motion tracking element. In an embodiment where the MTE 922 is coupled to the device, the raw motion data 924 represents the changing orientation of the device as it moves.

In an exemplary embodiment, the LTC 904 includes an image receiver 906, tracker 908, motion data receiver 916, and memory 910. The image receiver 906 receives one or more real-time images 912 from the image sensors 902 and processes these images into a real-time 2D image stream 914 that is passed to the tracker 908. For example, if the image stream 912 comprises images from multiple image sensors, the image receiver 906 operates to combine these images into the real-time 2D image stream 914. For example, in an exemplary embodiment, the image receiver 906 operates to stitch together multiple images from the image sensors 902 to generate the real-time 2D image stream 914 that provides a desired (e.g., 360°) field of view around the image sensors 902.

The motion data receiver 906 receives raw motion data 924 from the one or more motion tracking elements 922. In an exemplary embodiment, the motion data receiver 916 receives the raw motion data 924 and performs any type of preprocessing to generate motion data 926 that is suitable for use by the tracker 908. For example, the motion data receiver 916 operates to combine, average, scale, upsample, downsample, or otherwise preprocess the raw motion data 924 to generate the motion data 926 that is input to the tracker 908.

The tracker 908 receives the stream of images 914 and detects one or more light sources within the images. For example, in an exemplary embodiment, the tracker 908 utilizes one or more heuristics 920 that are stored in the memory 910 to detect one or more light sources in the captured images. For example, the tracker 908 performs the operations described above to convert the image to luminosity values and then performs a light source detection on the luminosity values using a light detection heuristic, which detects pixels with the highest luminosity values. For example, groups of pixels with high luminosity values can represent a light source. When a light source is detected, the tracker 908 operates to determine a light source location 918 that describes the location of the light source relative to the device. In one embodiment, the tracker 908 determines the direction of the light source relative to the device as described with reference to FIGS. 3-5. For example, the tracker 908 knows the X-Y location of the pixels of the detected light source and uses these coordinates to determine the azimuthal angles relative to the reference direction. In one embodiment, the tracker 908 determines the 3D position of the light source relative to the device using data from a structured light sensor or other sensor as described above. The tracker 908 then stores the light source location 918 in the memory 910. Additional details describing the operation of the tracker 908 are provided below.

In an exemplary embodiment, the tracker 908 uses motion data 926 received from the motion data receiver 916 to adjust the locations of the detected light sources. For example, the motion data 926 represents the change in orientation of the device over time. The tracker 908 uses this information to determine location offsets that represent the change in azimuthal angles of the orientation of the device as the device moves. For example, assuming that at a particular point in time, the device orientation can be expressed as ($\alpha 1$, $\beta 1$). A subsequent motion data reading indicates that the device orientation can be expressed as ($\alpha 2$, $\beta 2$). The tracker 908 determines the location offsets to be ($\alpha 2-\alpha 1$, $\beta 2-\beta 1$). The tracker 908 stores the location offsets in the memory 910 as indicated at 928.

In an exemplary embodiment, the tracker 908 adjusts the light source locations 918 of the detected light sources based on the location offsets. In an exemplary embodiment, the tracker 908 retrieves the light source locations 918 from the memory 910 and updates the locations based on the location offsets determined from the motion data 926. Since the motion data 926 may be updated faster than the frame rate of the images, it is possible to update the light source locations 918 faster than the frame rate of the images output from the image sensors 902.

In another embodiment, the tracker 908 determines when and how the light source locations are updated. For example, the tracker 908 waits for a specific time interval, which may be different from the frame rate of the image stream, and then updates the light source locations 918 with the motion data 926 based on expiration of that time interval. In still another embodiment, the tracker 908 determines when the relative change in orientation of the device exceeds a selected threshold and then updates the light source location 918 when this condition is reached. In still another embodiment, the tracker 908 determines when a pre-configured image analysis threshold is reached. For example, the image analysis threshold controls how long the tracker 908 updates the light source positions using the motion data before conducting another image analysis (e.g., light source detection). The image analysis threshold may be based on, for example, time, number of readings from the motion tracking element, confidence values provided by the motion tracking element, or a confidence value determined by the image analysis. When the image analysis threshold is reached, the tracker 908 operates to perform a light source detection on a newly received image. Thus, the location of a light source is determined from the new light source detection operation and stored in the memory 910. More detailed descriptions of the LTC 904 are provided below.

Figure 10:
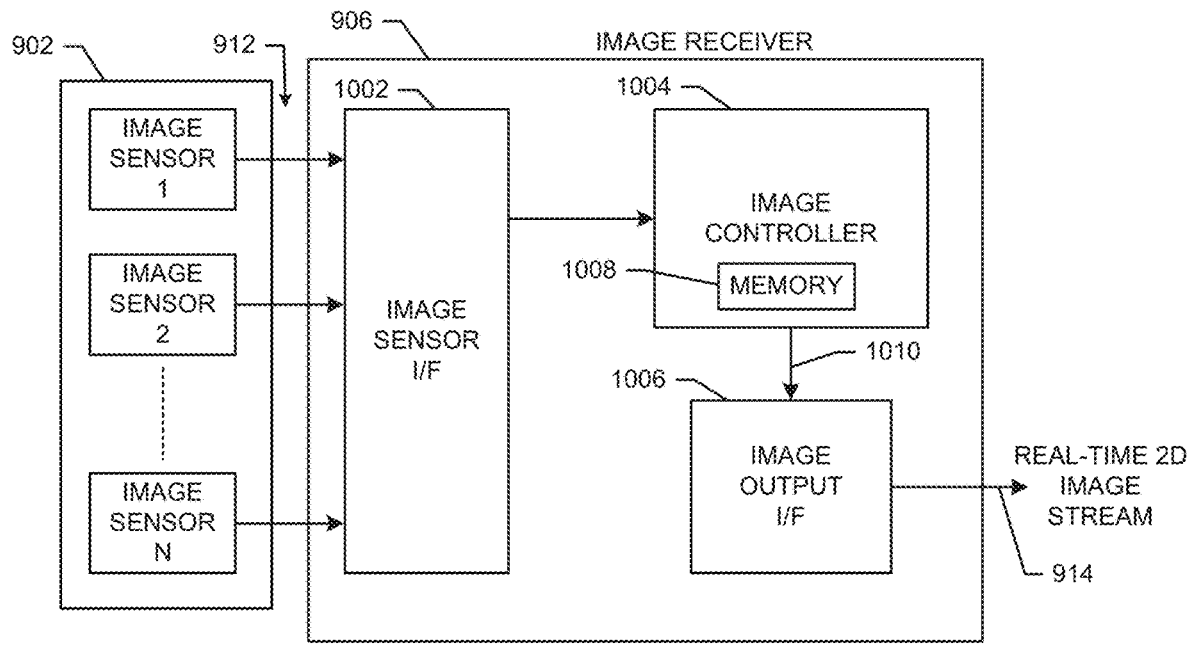
FIG. 10 shows detailed exemplary embodiments of the image sensors and the image receiver shown in FIG. 9.

FIG. 10 shows detailed exemplary embodiments of the image sensors 902 and the image receiver 906 shown in FIG. 9. In an exemplary embodiment, the image sensors 902 comprise one or more image sensors that capture images of the environment (or region) surrounding the device to which the image sensors 902 are mounted. In an exemplary embodiment, the image sensors 902 comprise one or more camera sensors that are arranged in such a way as to maximally cover the field of view (up to and even beyond 360°). For example, in one embodiment, the image sensors 902 comprise two opposing camera sensors, each with 180° field of view, that cover a full sphere encompassing the device to which the images sensors 902 are mounted. In an exemplary embodiment, the implementation of two camera sensors, each with a 180° field of view enables a bona fide 360° field of view to be obtained.

In various exemplary embodiments, the image sensors may include but are not limited to high resolution (HD) cameras, video cameras (e.g., outputting 30-60 fps), color or black and white cameras, and/or cameras having special lenses (e.g., wide angle or fish eye). If two cameras each having a 180° field of view are used, they may be placed in opposition to each other to obtain a 360° field of view. Other configurations include four cameras each with 90° field of view to obtain a 360° field of view, or multiple cameras with asymmetrical fields of view that are combined to obtain a 360° field of view.

In an exemplary embodiment, the image receiver 906 comprises an image sensor interface (I/F) 1002, image controller 1004, and image output I/F 1006. In various exemplary embodiments, each of the image sensor interface (I/F) 1002, image controller 1004, and image output I/F 1006 comprise at least one of a state machine, processor, gate array, programmable logic, registers, logic, memory, discrete components, and/or any other hardware to perform the functions described below. The image sensor I/F 1002 receives image data and passes this image data to the image controller 1004.

In an exemplary embodiment, the image controller 1004 receives real-time images from the image sensors 902 provided by the image sensor I/F 1002. The image controller 1004 operates to process those images into a real-time 2D image stream that is output to the image output interface 1006. For example, the image sensors 902 may include multiple image sensors that each output real-time 2D images or other image related data, such as average brightness. The image controller 1004 operates to combine these multiple real-time images into a real-time 2D image stream where each image provides a wide field of view around the image sensors 902. For example, each image may provide a 360° field of view around the image sensors 902. In an embodiment, the image controller 1004 operates to stitch together (or combine in any other way) multiple images received from the image sensors 902 to form the real-time 2D output image stream 1010. In one embodiment, the image controller 1004 includes a memory 1008 that provides storage to facilitate combining images from multiple image sensors.

Once acquisition and processing of the image sensor data is complete, the image controller 1004 outputs the real-time 2D image stream 1010 to the image output I/F 1006, which outputs the real-time 2D image stream 914. For example, as shown in FIG. 9, the real-time 2D image stream 914 is output from the image receiver 906 to the tracker 908.

Figure 11:
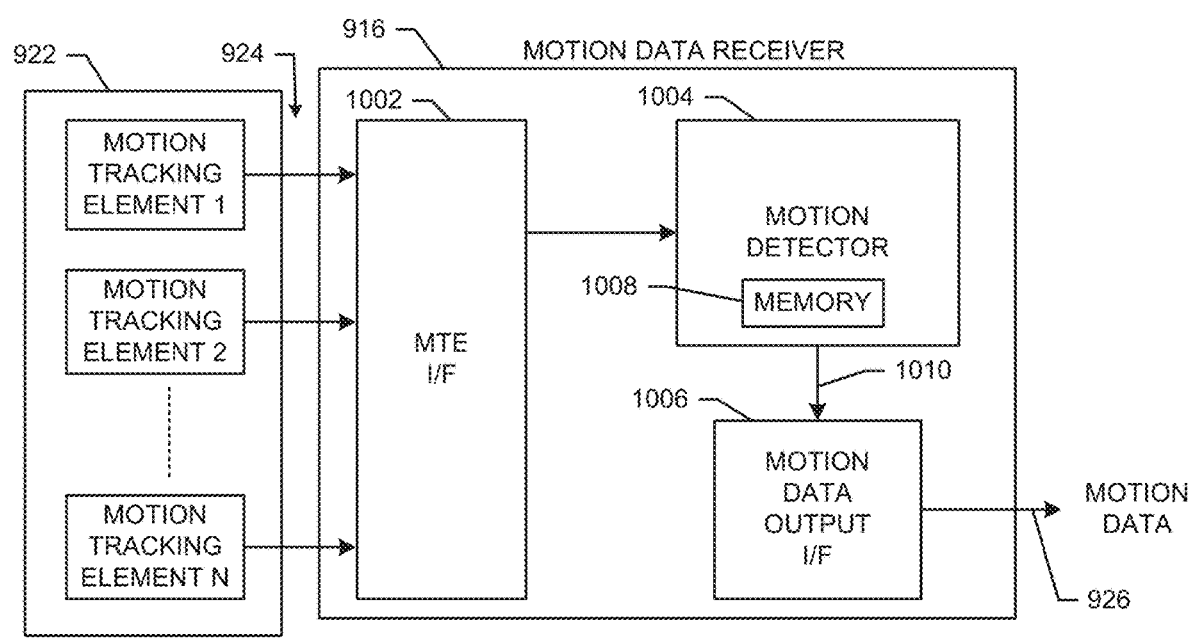
FIG. 11 shows detailed exemplary embodiments of the motion tracking element and the motion data receiver shown in FIG. 9.

FIG. 11 shows a detailed exemplary embodiment of the MTE 922 and the motion data receiver 916 shown in FIG. 9. In an exemplary embodiment, the MTE 922 comprises one or more motion tracking elements that capture motion of the device to which the MTE 922 are mounted. In an exemplary embodiment, the MTE 922 comprise at least one of a 3-axis gyroscope, compass, accelerometer, global positioning system (GPS) receiver, laser interferometer-based gyroscope, ultrasonic sensor, or any other motion tracking device.

In one embodiment, the MTE 922 comprises a structured light sensor (or other type of sensor(s)) that detects both angular position and distance between the device and the detected light source. In one embodiment, the data from the structured light sensor is used to configure an environmentally lit device display by arranging point lights in a 3D scene also containing display elements. The point lights are arranged as to model the position of the real, physical light source as detected and measured by the structured light sensor, including distance from the device. The positions of the light sources are then updated over time using positional data provided by one or a combination of the sensors of the MTE 922.

In an exemplary embodiment, the motion data receiver 916 comprises MTE I/F 1002, motion detector 1004, and motion data output I/F 1006. In exemplary embodiments, the MTE I/F 1002, motion detector 1004, and motion data output I/F 1006 each comprise at least one of a processor, programmable logic, state machine, registers, logic, memory, discrete components, and/or any other hardware to perform the functions described below.

In an exemplary embodiment, the MTE I/F 1002 operates to receive raw motion data 924 output from the MTE 922. In an exemplary embodiment, the received raw motion data may be stored or buffered by the MTE I/F 1002.

In an exemplary embodiment, the motion detector 1004 receives the raw motion data 924 and performs any desired processing to generate processed motion data 1010. For example, the motion detector 1004 performs averaging, upsampling, downsampling, translation, conversion, scaling, and/or any other process to the raw motion data to generate the processed motion data 1010. The motion detector 1004 may utilize memory 1008 during its processing of the motion data. Once acquisition and processing of the motion data is complete, the motion detector 1004 outputs the processed motion data 1010 to the motion data output I/F 1006, which generates the motion data 926 output. For example, as shown in FIG. 9, the motion data 926 is output from the motion data receiver 916 and input to the tracker 908.

Figure 12:
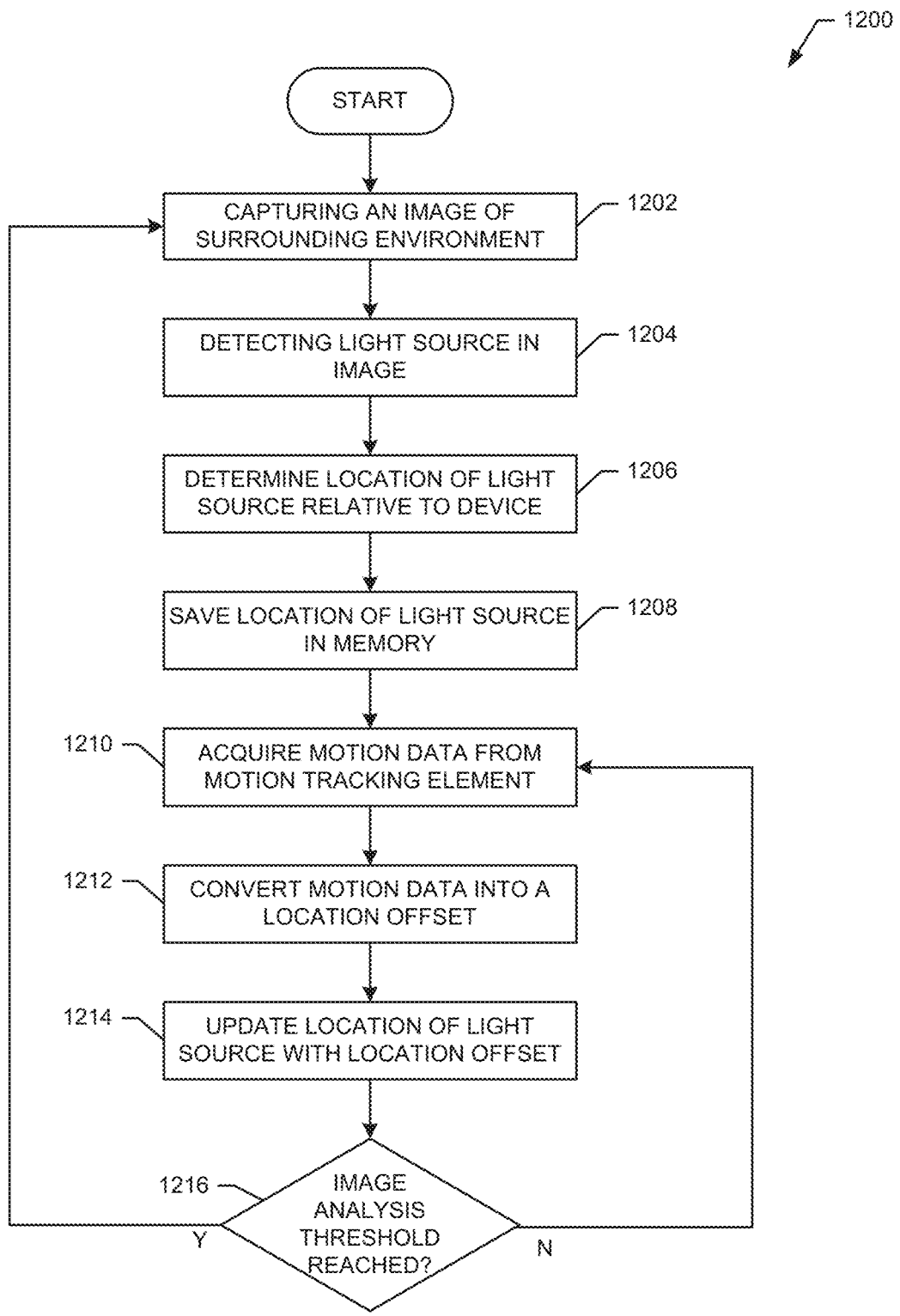
FIG. 12 shows an exemplary embodiment of a method for detecting and tracking light sources in a captured image using motion data from a motion tracking element.

FIG. 12 shows an exemplary embodiment of a method 1200 for detecting and tracking light sources in a captured image using motion data from a motion tracking element. For example, the method 1200 is suitable for use with the LTS 900 shown in FIG. 9.

At block 1202, a real-time 2D image is acquired. For example, in an exemplary embodiment, the 2D image is captured by one or more of the image sensors 902. For example, the image sensors can be part of a camera system attached to a hand-held device. In one embodiment, the acquired image provides a 360° field of view of the region surrounding the location of the image sensors. In an exemplary embodiment, the image sensors 902 output images at a frame rate of 30 fps. In exemplary embodiments, the image sensors include but are not limited to a high-resolution imaging sensor(s) that provides color data, auto-exposing imaging sensor(s) that provides both color data and brightness of the device's surroundings by way of an ISO value.

At block 1204, a light source is detected in the captured image. For example, in an exemplary embodiment, the tracker 908 performs this operation to detect light sources in the captured image. In an exemplary embodiment, the tracker 908 utilizes one or more heuristics 920 to process the image to detect light sources. For example, as discussed above, in one heuristic, the pixels of the captured image are converted to luminosity values and these values are searched to determine image pixels having luminosity values above a selected threshold. These pixels represent a detected light source in the image.

At block 1206, the location of the light source is determined. For example, the X-Y locations of the pixels of the light source are used to determine a direction of the light source relative to a reference direction. For example, in an exemplary embodiment, the tracker 908 converts the X-Y locations of the light source to azimuthal angles relative to a reference direction. The azimuthal angles represent the location of the light source relative to the reference direction. For example, as illustrated in FIGS. 4-5, the X-Y locations of the detected light source 302 are translated into the azimuthal angles α and β that represent the location of the light source relative to the reference direction.

At block 1208, the location of the light source is saved in memory. For example, the tracker 908 saves the location of the detected light source to the memory 910 as illustrated by light source locations 918.

At block 1210, motion data from a motion tracking element is acquired. For example, the motion data receiver 916 receives raw motion data 924 from one or more motion tracking elements 922, processes this raw motion data 924 to generate motion data 926 that is passed to the tracker 908. In an exemplary embodiment, the motion data represents the orientation of the device. In an exemplary embodiment, the tracker 908 saves the motion data in the memory 910.

At block 1212, the motion data is converted into a location offset. The tracker 908 maintains a history of motion data in the memory 910. By comparing motion data values, the tracker 908 calculates changes in the orientation of the device over time. The tracker 908 then converts the change in orientation to a location offset that describes the change in azimuthal angles of the device. The determined location offsets 928 are stored in the memory 910.

In an exemplary embodiment, the tracker 908 records one frame of device orientation as "previous," and a second frame of device orientation as "current." The location offset is calculated by subtracting the previous orientation from the current orientation. All tracked positions are then updated according to the location offset. At this point, the current orientation is set to "previous", and a new "current" is acquired from the MTE. This process will be repeated to update the location of the light sources as the device moves.

At block 1214, the locations of the detected light sources are updated based on the location offset. For example, the tracker 908 performs this operation by adjusting the light source locations with the location offset. For example, the tracker 908 adjusts the azimuthal angles associated with the detected light source with azimuthal angles associated with the location offset. The tracker 908 then saves the updated location of the detected light source.

At block 1216, a determination is made as to whether an image analysis threshold has been reached. For example, the tracker 908 determines whether the image analysis threshold has been reached. In exemplary embodiments, the image analysis threshold is based on, for example, time, number of readings from the motion tracking element, confidence values provided by the motion tracking element, or a confidence value determined by the image analysis. If the image analysis threshold has not been reached, the method proceeds to block 1210 where detected light sources are tracked using motion data. If the image analysis threshold has been reached, the method proceeds to block 1202 where image analysis is performed to reacquired the light sources and their relative locations.

Thus, the method 1200 operates to detect and track light sources in captured images using motion data from a motion tracking element. It should be noted that although the method 1200 describes specific operations, these operations may be changed, modified, rearranged, added to, and subtracted from within the scope of the embodiments.

Feature Tracking

In an exemplary embodiment, the LTS 202 operates to detect and locate features in the environment surrounding the device 200 from images acquired by the sensor 206. For example, the LTS 202 detects non-facial features, such as buildings, vehicles, trees, or any other non-facial feature and determines the position of these detected non-facial features relative to the device 200, orientation of a device display screen, and/or relative to a reference (REF) direction. For example, the LTC 204 analyzes the captured images using one or more heuristics to detect one or more non-facial features to be tracked. Once a feature is detected, its location is calculated relative to the device, such as by calculating the location of the feature relative to the REF direction. Since the orientation of the image sensor 208 to the device 200 is known, the orientation of the captured image to the REF direction is also known. Thus, the LTC 204 is able to translate the location of the feature in the image to a relative location of that feature to the device. In an exemplary embodiment, the LTC 204 operates to calculate latitudinal α, and longitudinal β angles that determine the location of the feature relative to the REF direction. It should be noted that the LTS 202 is not limited to detecting only one feature; thus, multiple features can be detected and their associated relative locations determined by the LTS 202.

Once the relative location of the detected feature is determined, motion data from the MTE 206 is used to update that relative location as the device and image sensor are moved as described above. In an exemplary embodiment, the method 1200 is modified as shown below to detect and track features in the images captured by the image sensor.

At blocks 1204 and 1206, features and their relative positions are detected in the real-time 2D image. For example, in an exemplary embodiment, the tracker 908 performs this operation to detect non-facial features and generate feature locations that are stored in the memory 910. In an exemplary embodiment, the tracker 908 performs one or more heuristics on the image to detect the non-facial features and then determines their relative locations based on the relationship between the image sensor and a reference direction associated with the device.

At block 1214, the locations of the detected features are updated based on the motion tracking data. For example, the tracker 908 performs this operation by calculating relative changes in the orientation of the device based on the motion data 926 (e.g., location offsets) and then applies these location offsets to the feature locations 918 stored in the memory.

Thus, the method 1200 is modified to detect and track features in captured images using motion data from a motion tracking element. It should be noted that although the method 1200 describes specific operations, these operations may be changed, modified, rearranged, added to, and subtracted from within the scope of the embodiments.

While particular embodiments of the present invention have been shown and described, it will be obvious to those skilled in the art that, based upon the teachings herein, changes and modifications may be made without departing from these exemplary embodiments of the present invention and its broader aspects. Therefore, the appended claims are intended to encompass within their scope all such changes and modifications as are within the true spirit and scope of these exemplary embodiments of the present invention.

What is claimed is:

1. A method for displaying captured images on a smartphone via a light tracking system, comprising:

capturing, by an image sensor of the smartphone, an image representing a surrounding environment of the smartphone;

analyzing the image to detect a light source associated with the image;

calculating a location of the light source relative to the smartphone;

displaying the image on a screen of the smartphone in response to the location of the light source relative to the smartphone;

receiving motion data corresponding to movement of the smartphone; and redisplaying the image after adjusting the location of the light source based on the motion data.

2. The method of claim 1, further comprising repeating the operations of calculating and adjusting to update the location of the light source as the smartphone moves.

3. The method of claim 1, further comprising acquiring the image from one or more image sensors at the smartphone.

4. The method of claim 1, wherein the operation of analyzing comprises analyzing the image using a light detection heuristic to detect the light source in the image.

5. The method of claim 4, wherein the operation of calculating comprises calculating latitudinal and longitudinal angles of the light source relative to a reference direction associated with the smartphone based on the location.

6. The method of claim 4, wherein the operation of calculating comprises calculating a 3D position of the light source relative to the smartphone based on the location and a distance value determined from a sensor.

7. The method of claim 5, wherein the operation of adjusting comprises:

calculating a location offset from the motion data; and adjusting the latitudinal and longitudinal angles of the light source relative to the smartphone based on the location offset.

8. The method of claim 1, wherein the operation of receiving comprises receiving the motion data from a motion tracking element that is coupled to the smartphone.

9. The method of claim 8, wherein the motion tracking element comprises at least one motion tracking element selected from a set comprising a 3-axis gyroscope, compass, accelerometer, global positioning system (GPS) receiver, laser interferometer, and ultrasonic sensor.

10. The method of claim 1, further comprising performing the method on a handheld device.

11. The method of claim 1, further comprising performing the method on at least one of a computer, tablet computer, desktop computer, or laptop computer.

12. An apparatus of a smartphone configured to provide network communication, comprising:

an image sensor that acquires an image of an environment surrounding a smartphone;

a motion tracking element coupled to the image sensor that outputs motion data that corresponds to physical motion of the smartphone device;

a tracker coupled to the image tracking element that analyzes the image to detect a light source associated with the image and calculates a location of the light source relative to the smartphone, and wherein the tracker adjusts the location of the light source relative to the smartphone based on the motion data; and a display coupled to the tracker and configured to redisplay an updated image based on the previously captured image, the motion data, and the location of the light source relative to the smartphone.

13. The apparatus of claim 12, wherein the motion tracking element comprises at least one motion tracking element selected from a set comprising a 3-axis gyroscope, compass, accelerometer, global positioning system (GPS) receiver, laser interferometer, and ultrasonic sensor.

14. The apparatus of claim 12, wherein the tracker analyzes the image using a light detection heuristic to detect the light source in the image.

15. The apparatus of claim 14, wherein the tracker calculates latitudinal and longitudinal angles of a direction of the light source relative to a reference direction associated with the device based on the location.

16. The apparatus of claim 15, wherein the tracker calculates location offsets from the motion data and adjusts the latitudinal and longitudinal angles based on the location offsets.

17. The apparatus of claim 14, wherein the apparatus is configured to operate in a handheld device.

18. The apparatus of claim 14, wherein the apparatus is configured to operate in at least one of a computer, smartphone, tablet computer, desktop computer, or laptop computer.

19. A method for displaying captured images on a smartphone via a light tracking system, comprising:

acquiring, by an image sensor of the smartphone, an image of an environment representing a surrounding image of the smartphone;

analyzing the image to detect a feature in the image including identifying and locating a light source;

determining a relative position and orientation between the light source and the smartphone;

calculating a location of the feature relative to the smartphone in accordance with the relative position and orientation between the light source and the smartphone;

displaying the image including the feature on a screen of the smartphone in response to the relative position and orientation between the light source and the smartphone; receiving motion data corresponding to movement of the smartphone; and adjusting the image on the screen to a reflect new location of the feature and the relative position and orientation between the light source and the smartphone based on the motion data.

20. The method of claim 19, wherein the feature comprises non-facial features that appear in the image.

* * * * *